(12) United States Patent
Utaka

(10) Patent No.: US 8,674,577 B2
(45) Date of Patent: Mar. 18, 2014

(54) STATOR FOR ELECTRIC ROTATING MACHINE

(75) Inventor: Ryosuke Utaka, Takahama (JP)

(73) Assignee: Denso Corporation, Kariya (JP)

( * ) Notice: Subject to any disclaimer, the term of this patent is extended or adjusted under 35 U.S.C. 154(b) by 405 days.

(21) Appl. No.: 13/076,966

(22) Filed: Mar. 31, 2011

(65) Prior Publication Data

US 2011/0241461 A1    Oct. 6, 2011

(30) Foreign Application Priority Data

Mar. 31, 2010   (JP) .................................. 2010-082919
Mar. 3, 2011    (JP) .................................. 2011-046483

(51) Int. Cl.
*H02K 3/28* (2006.01)

(52) U.S. Cl.
USPC ........................................... 310/201; 310/71

(58) Field of Classification Search
USPC .................................................... 310/71, 201
See application file for complete search history.

(56) References Cited

U.S. PATENT DOCUMENTS

| | | | | |
|---|---|---|---|---|
| 2,407,935 | A * | 9/1946 | Perfetti et al. ................. | 310/201 |
| 6,208,058 | B1 * | 3/2001 | Taji et al. ...................... | 310/201 |
| 6,710,501 | B1 | 3/2004 | Kusumoto et al. | |
| 2005/0140239 | A1 * | 6/2005 | Klamt et al. .................. | 310/201 |
| 2005/0229381 | A1 * | 10/2005 | Kato ............................... | 29/596 |
| 2008/0191574 | A1 * | 8/2008 | Tokizawa ...................... | 310/179 |
| 2009/0200888 | A1 * | 8/2009 | Tanaka et al. ................. | 310/195 |
| 2011/0012450 | A1 | 1/2011 | Umeda et al. | |

FOREIGN PATENT DOCUMENTS

JP    2001-145286    5/2001

OTHER PUBLICATIONS

Office Action (6 pages) dated Mar. 15, 2013, issued in corresponding Chinese Application No. 201110084933.X and English translation (8 pages).
Utaka, U.S. Appl. No. 13/076,986, filed Mar. 31, 2011.
Utaka et al, U.S. Appl. No. 13/077,007, filed Mar. 31, 2011.

* cited by examiner

*Primary Examiner* — Tran Nguyen
(74) *Attorney, Agent, or Firm* — Nixon & Vanderhye PC

(57) ABSTRACT

A stator for an electric rotating machine includes a hollow cylindrical stator core and a multi-phase stator coil comprised of a plurality of electric wires mounted on the stator core. The stator coil includes a plurality of phase windings each of which is formed of at least two electric wires. One of the two electric wires has an end portion led out from the radially inner periphery of one slot of the stator core while the other electric wire has an end portion led out from the radially outer periphery of another slot of the stator core. The end portions of the two electric wires are joined together to form a joint therebetween. The joint is positioned axially outward of a coil end part of the stator coil, which protrudes from an axial end face of the stator core, without radially protruding from the coil end part.

3 Claims, 5 Drawing Sheets

STATOR FOR ELECTRIC ROTATING MACHINE

CROSS-REFERENCE TO RELATED APPLICATIONS

This application is based on and claims priority from Japanese Patent Applications No. 2010-82919 filed on Mar. 31, 2010 and No. 2011-46483 filed on Mar. 3, 2011, the contents of which are hereby incorporated by reference in their entireties into this application.

BACKGROUND

1. Technical Field

The present invention relates to stators for electric rotating machines that are used in, for example, motor vehicles as electric motors and electric generators.

2. Description of Related Art

Conventionally, there are known stators for electric rotating machines which include a hollow cylindrical stator core and a stator coil. The stator core has a plurality of slots that are formed in the radially inner surface of the stator core and spaced in the circumferential direction of the stator core. The stator coil is comprised of a plurality of electric wires mounted on the stator core.

Moreover, there is disclosed, for example in Japanese Patent Application Publication No. 2001-145286, a method of manufacturing a stator. According to the method, to improve the space factors of the electric wires in the slots of the stator core, each of U-phase, V-phase, and W-phase windings of the stator coil is configured to have a rectangular cross section and have such an overall shape that when developed on a plane, the winding meanders in the form of cranks. Further, each of the U-phase, V-phase, and W-phase windings is wound by a predetermined number of turns into a spiral shape, so as to make the stator coil have a hollow cylindrical shape.

With the above method, however, each of the electric wires (or electric conductors) that respectively make up the U-phase, V-phase, and W-phase windings of the stator coil is required to have a long length. Accordingly, a large-scale shaping machine is needed for shaping the electric wires. Moreover, since each of the electric wires is long, it is difficult to handle the electric wires during the manufacture of the stator. As a result, it is difficult to secure a high productivity and a low cost of the stator.

To solve the above problems, the assignee of the present application (i.e., Denso Corporation) has developed a stator 20 as shown in FIG. 9. It should be noted that for the stator 20, the assignee of the present application has already applied for both a Japanese patent (application No. 2009-241798) and a U.S. patent (application Ser. No. 12/837,726).

The stator 20 includes a hollow cylindrical stator core 30 and a stator coil 40. The stator core 30 has, as shown in FIG. 10, a plurality of slots 31 that are formed in the radially inner surface of the stator core 30 and spaced in the circumferential direction of the stator core 30. The stator coil 40 is comprised of a plurality of electric wires mounted on the stator core 30.

Each of the electric wires has first, second, . . . , nth in-slot portions and first, second, . . . , (n−1)th turn portions, where n is an integer not less than 4. The first to the nth in-slot portions are sequentially received in p of the slots 31 of the stator core 30, where p is an integer not greater than n. The first to the (n−1)th turn portions are alternately located on opposite axial sides of the stator core 30 outside the slots 31 to connect corresponding adjacent pairs of the first to the nth in-slot portions. Each of the electric wires also has first and second end portions. The first end portion is closer to the first in-slot portion than any other of the in-slot portions of the electric wire; the second end portion is closer to the nth in-slot portion than any other of the in-slot portions of the electric wire. The first in-slot portions of the electric wires are located most radially outward and the nth in-slot portions are located most radially inward in the slots 31 of the stator core 30. Moreover, the stator coil 40 is a multi-phase (e.g., three-phase) stator coil that includes a plurality of phase windings. Each of the phase windings of the stator coil 40 is formed of at least two of the electric wires. The first end portion of one of the two electric wires is connected to the second end portion of the other electric wire.

With the above configuration, since each of the phase windings of the stator coil 40 is formed of the at least two electric wires, it is possible to shorten the length of each of the electric wires. Consequently, the electric wires can be shaped using a small-scale shaping machine and be easily handled during the manufacture of the stator 20. As a result, it is possible to achieve a high productivity and a low cost of the stator.

Moreover, in the stator 20, for each connected pair of the electric wires forming the stator coil 40, the first end portion of one of the electric wires is connected to the second end portion of the other electric wire via an electrically-conductive crossover member 70. The crossover member 70 extends to cross over an annular coil end part 40A of the stator coil 40, which protrudes from a corresponding axial end face 30A of the stator core 30, from the radially inside to the radially outside of the coil end part 40A. Furthermore, the crossover member 70 may be configured as an integral part of the second end portion of the other electric wire, as shown in FIG. 9. In this case, the first and second end portions of the pair of the electric wires are joined together by welding, forming a joining portion 70a therebetween.

However, with the above configuration, the joining portions 70a between the first and second end portions of the connected pairs of the electric wires are formed to protrude from the coil end part 40A radially outward, thereby increasing the radial size of the stator coil 40.

SUMMARY

According to the present invention, there is provided a stator for an electric rotating machine. The stator includes a hollow cylindrical stator core and a stator coil. The stator core has a plurality of slots that are formed in the radially inner surface of the stator core and spaced in the circumferential direction of the stator core. The stator coil is comprised of a plurality of electric wires mounted on the stator core. The stator coil is partially received in the slots of the stator core to have a pair of coil end parts that respectively protrude from a pair of axial end faces of the stator core. Further, the stator coil is a multi-phase stator coil which is comprised of a plurality of phase windings. Each of the phase windings of the stator coil is formed of at least two of the electric wires. One of the two electric wires has an end portion led out from the radially inner periphery of one of the slots of the stator core while the other electric wire has an end portion led out from the radially outer periphery of another one of the slots of the stator core. The end portions of the two electric wires are joined together to form a joint therebetween. The joint is positioned axially outward of one of the coil end parts of the stator coil without radially protruding from the coil end part.

With the above configuration, it is possible to minimize the radial size of the stator coil, thereby minimizing the overall size of the entire stator.

It is preferable that the joint is substantially equidistant from the two slots from which the end portions of the two electric wires are respectively led out.

It is also preferable that the end portion which is led out from the radially inner periphery of the one slot is bent radially outward while the end portion which is led out from the radially outer periphery of the another slot is bent radially inward.

In one embodiment of the invention, the end portions of the two electric wires have respective distal end surfaces that are arranged to face each other in a radial direction of the stator core. The distal end surfaces of the end portions are joined together to form the joint between the end portions.

In another embodiment of the invention, the end portions of the two electric wires have respective circumferential side surfaces that are arranged to face each other in the circumferential direction of the stator core. The circumferential side surfaces of the end portions are joined together to form the joint between the end portions.

In yet another embodiment of the invention, the end portions of the two electric wires have respective axial side surfaces that are arranged to face each other in the axial direction of the stator core. The axial side surfaces of the end portions are joined together to form the joint between the end portions.

In still another embodiment of the invention, each of the end portions of the two electric wires has a distal end surface that is formed to extend obliquely with respect to a longitudinal direction of the end portion. The distal end surfaces of the end portions are arranged to abut each other and joined together to form the joint between the end portions.

In yet another embodiment of the invention, each of the end portions of the two electric wires has a distal end surface. The distal end surface of one of the end portions has a protrusion formed thereon while the distal end surface of the other end portion has a recess formed therein. The distal end surfaces of the end portions are arranged to abut each other with the protrusion fitted into the recess. The distal end surfaces are joined together to form the joint between the end portions.

In still another embodiment of the invention, each of the end portions of the two electric wires is stepped at its distal end to have first to third surfaces. The first surface is perpendicular to the longitudinal direction of the end portion and positioned distalmost in the end portion. The second surface is perpendicular to the longitudinal direction and recessed from the first surface in the longitudinal direction. The third surface extends parallel to the longitudinal direction to connect the first and second surfaces. The end portions are arranged so that the first, second and third surfaces of one of the end portions respectively abut the second, first and third surfaces of the other end portion. The abutting pairs of the first to third surfaces of the end portions are joined together to form the joint between the end portions.

In yet still another embodiment of the invention, both the end portions of the two electric wires are bent axially outward at their respective distal ends so as to have parts of the end portions in pressed contact with each other. The parts of the end portions which are in pressed contact with each other are joined together to form the joint between the end portions.

BRIEF DESCRIPTION OF THE DRAWINGS

The present invention will be understood more fully from the detailed description given hereinafter and from the accompanying drawings of preferred embodiments of the invention, which, however, should not be taken to limit the invention to the specific embodiments but are for the purpose of explanation and understanding only.

In the accompanying drawings.

DESCRIPTION OF PREFERRED EMBODIMENTS

Figure 1:
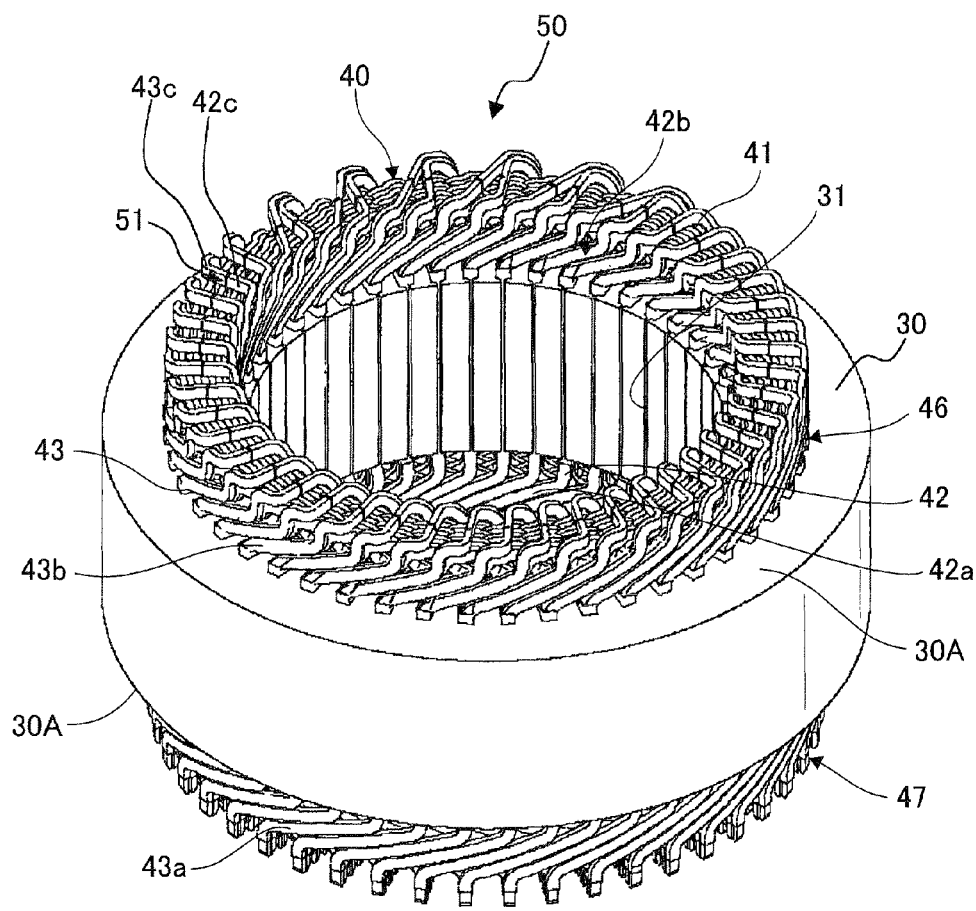
FIG. 1 is a perspective view showing the overall configuration of a stator for an electric rotating machine according to the first embodiment of the invention.

Preferred embodiments of the present invention will be described hereinafter with reference to FIGS. 1-8. It should be noted that for the sake of clarity and understanding, identical components having identical functions in different embodiments of the invention have been marked, where possible, with the same reference numerals in each of the figures and that for the sake of avoiding redundancy, descriptions of the identical components will not be repeated.

First Embodiment

FIG. 1 shows the overall configuration of a stator 50 for an electric rotating machine according to the first embodiment of the invention. The stator 50 is designed for use in, for example, an electric rotating machine which is configured to function both as an electric motor and as an electric generator in a motor vehicle. The electric rotating machine further includes a rotor (not shown) that is rotatably disposed so as to be surrounded by the stator 50. The rotor includes a plurality of permanent magnets that form a plurality of magnetic poles on a radially outer periphery of the rotor to face a radially inner periphery of the stator 50. The polarities of the magnetic poles alternate between north and south in the circumferential direction of the rotor. In addition, in the present embodiment, the number of the magnetic poles formed in the rotor is equal to eight (i.e., four north poles and four south poles).

As shown in FIG. 1, the stator 50 includes a hollow cylindrical stator core 30 and a stator coil 40 that is formed by joining a plurality of electric wire segments mounted on the stator core 30. In addition, the stator 50 may further include insulating paper interposed between the stator core 30 and the stator coil 40.

Figure 10:
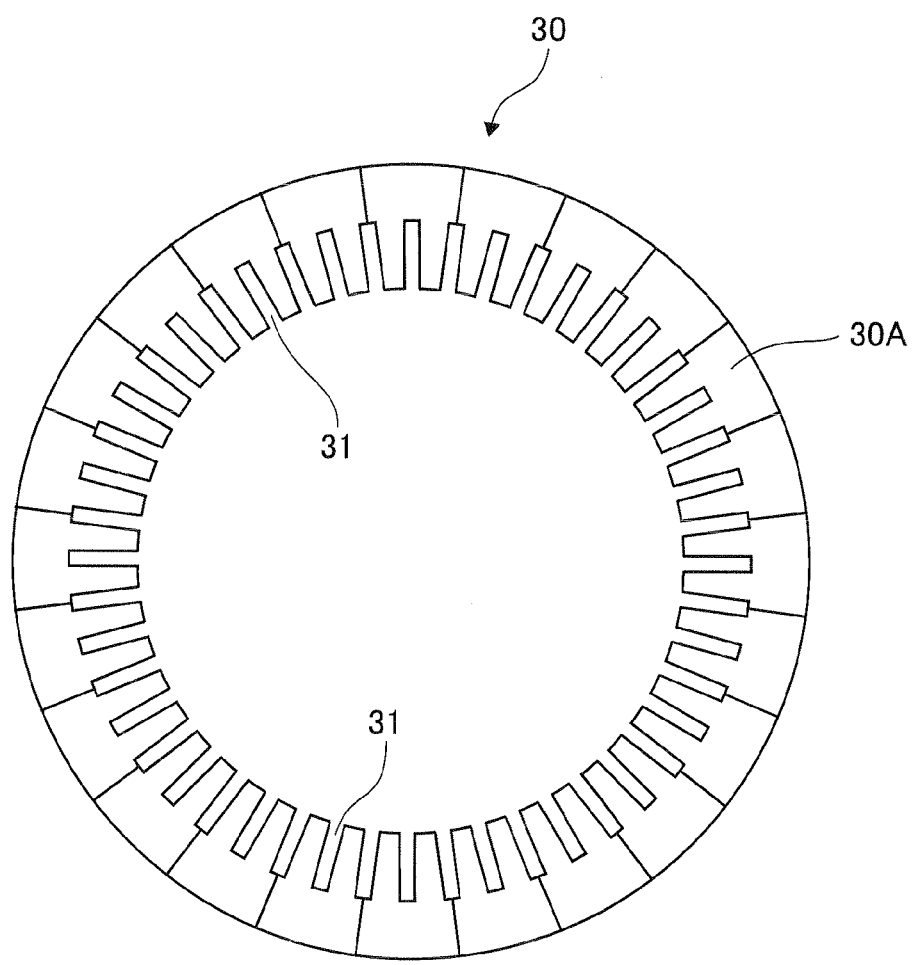
FIG. 10 is an axial end view of a stator core.

The stator core 30 is configured as shown in FIG. 10. Specifically, the stator core 30 has a plurality of slots 31 that are formed in the radially inner surface of the stator core 30 and spaced in the circumferential direction of the stator core 30. For each of the slots 31, the depth-wise direction of the slot 31 is coincident with a radial direction of the stator core 30. In the present embodiment, there are provided two slots 31 per magnetic pole of the rotor that has the eight magnetic poles and per phase of the three-phase stator coil 40. Accordingly, the total number of the slots 31 provided in the stator core 30 is equal to 48 (i.e., 2×8×3).

In the present embodiment, the stator core 30 is formed by laminating a plurality of magnetic steel sheets with a plurality of insulating films interposed therebetween. It should be noted that other conventional metal sheets may also be used instead of the magnetic steel sheets.

The stator coil 40 is formed by first inserting the plurality of electric wire segments into the slots 31 of the stator core 30 in a predetermined manner and then joining them in a predetermined pattern by welding.

In the present embodiment, the electric wire segments forming the stator coil 40 include first electric wire segments 41, second electric wire segments 42 and third electric wire segments 43. The stator coil 40 is a three-phase stator coil which includes U-phase, V-phase and W-phase windings. Each of the U-phase, V-phase and W-phase windings is formed by serially connecting a predetermined number of the first, second, and third electric wire segments 41, 42 and 43.

Moreover, each of the first, second, and third electric wire segments 41, 42 and 43 is comprised of an electric conductor segment having a substantially rectangular cross section and an insulating coat that covers the outer surface of the electric conductor segment. In addition, for facilitating the welding of the first, second, and third electric wire segments 41, 42 and 43, the insulating coats are stripped from respective end parts of the electric wire segments 41, 42 and 43.

Each of the first electric wire segments 41 is substantially U-shaped to include a pair of straight portions that extend parallel to each other and a turn portion that connects the straight portions at ends thereof on the same side.

For each of the first electric wire segments 41, the straight portions of the first electric wire segment 41 are respectively inserted, from one axial side (i.e., the upper side in FIG. 1) of the stator core 30, into a corresponding pair of the slots 31 of the stator core 30 which are apart from each other by one magnetic pole pitch of the rotor (i.e., by six slot pitch of the stator core 30 in the present embodiment). Consequently, distal end parts of the straight portions respectively protrude from the corresponding slots 31 of the stator core 30 on the other axial side (i.e., the lower side in FIG. 1) of the stator core 30. Then, each of the distal end parts of the straight portions is bent at a predetermined angle with respect to the corresponding axial end face 30A (i.e., the lower end face 30A in FIG. 1) of the stator core 30, forming an oblique part (not shown); the oblique part extends obliquely with respect to the corresponding axial end face 30A and along the circumferential direction of the stator core 30. In addition, the oblique part has a circumferential length substantially equal to a half magnetic pole pitch of the rotor.

All the straight portions of the first electric wire segments 41 are received in the slots 31 of the stator core 30 so that in each of the slots 31, eight straight portions of the first electric wire segments 41 are stacked in the radial direction of the stator core 30. More specifically, in each of the slots 31, the eight straight portions of the first electric wire segments 41 are radially stacked to respectively occupy the second to the ninth layers in the slot 31. Moreover, on the one axial side (i.e., the upper side in FIG. 1) of the stator core 30, the turn portions of the first electric wire segments 41, which protrude outside the slots 31 of the stator core 30, together form a first coil end part 46 of the stator coil 40 which has an annular shape.

Each of the second electric wire segments 42 is configured to include a straight portion and a radially inner lead portion.

The straight portion is inserted, from the one axial side (i.e., the upper side in FIG. 1) of the stator core 30, into a corresponding one of the slots 31 of the stator core 30 so as to be located radially innermost in the corresponding slot 31. Consequently, the straight portion is located to occupy the first layer in the corresponding slot 31, with a distal end part of the straight portion protruding from the corresponding slot 31 on the other axial side (i.e., the lower side in FIG. 1) of the stator core 30. Then, the distal end part of the straight portion is bent at a predetermined angle with respect to the corresponding axial end face 30A (i.e., the lower end face 30A in FIG. 1) of the stator core 30, forming an oblique part 42a; the oblique part 42a extends obliquely with respect to the corresponding axial end face 30A and along the circumferential direction of the stator core 30. In addition, the oblique part 42a has a circumferential length substantially equal to a half magnetic pole pitch of the rotor.

The radially inner lead portion is located on the one axial side (i.e., the upper side in FIG. 1) of the stator core 30 and configured to include a first part 42b and a second part 42c. The first part 42b extends from the straight portion of the second electric wire segment 42 obliquely with respect to the corresponding axial end face 30A (i.e., the upper end face 30A in FIG. 1) of the stator core 30 and along the circumferential direction of the stator core 30. The second part 42c extends, from the first part 42b, radially outward on the axially outside of the first coil end part 46 of the stator coil 40. That is, the second part 42c is positioned axially outward of the first coil end part 46. Moreover, the distal end of the second part 42c is radially positioned so as to be substantially equidistant from the radially inner and outer peripheries of the annular first coil end part 46.

Each of the third electric wire segments 43 is configured to include a straight portion and a radially outer lead portion.

The straight portion is inserted, from the one axial side (i.e., the upper side in FIG. 1) of the stator core 30, into a corresponding one of the slots 31 of the stator core 30 so as to be located radially outermost in the corresponding slot 31. Consequently, the straight portion is located to occupy the tenth layer in the corresponding slot 31, with a distal end part of the straight portion protruding from the corresponding slot 31 on the other axial side (i.e., the lower side in FIG. 1) of the stator core 30. Then, the distal end part of the straight portion is bent at a predetermined angle with respect to the corresponding axial end face 30A (i.e., the lower end face 30A in FIG. 1) of the stator core 30, forming an oblique part 43a; the oblique part 43a extends obliquely with respect to the corresponding axial end face 30A and along the circumferential direction of the stator core 30. In addition, the oblique part 43a has a circumferential length substantially equal to a half magnetic pole pitch of the rotor.

The radially outer lead portion is located on the one axial side (i.e., the upper side in FIG. 1) of the stator core 30 and configured to include a first part 43b and a second part 43c. The first part 43b extends from the straight portion of the third electric wire segment 43 obliquely with respect to the corresponding axial end face 30A (i.e., the upper end face 30A in FIG. 1) of the stator core 30 and along the circumferential direction of the stator core 30. The second part 43c extends, from the first part 43b, radially inward on the axially outside of the first coil end part 46 of the stator coil 40. That is, the second part 43c is positioned axially outward of the first coil end part 46. Moreover, the distal end of the second part 43c is radially positioned so as to be substantially equidistant from the radially inner and outer peripheries of the annular first coil end part 46.

As above, all the straight potions of the first, second and third electric wire segments 41, 42 and 43 are inserted into the corresponding slots 31 of the stator core 30. Consequently, in each of the slots 31 of the stator core 30, there are stacked a total of ten straight potions of the first, second and third electric wire segments 41, 42 and 43 in the radial direction of the stator core 30. Moreover, in each of the slots 31, the first layer (i.e., the radially innermost layer) is occupied by the corresponding one of the straight portions of the second electric wire segments 42 while the tenth layer (i.e., the radially outermost layer) is occupied by the corresponding one of the straight portions of the third electric wire segments 43. In addition, in the present embodiment, all the straight potions of the first, second and third electric wire segments 41, 42 and 43 are bent at the same time to form the respective oblique parts on the other axial side (i.e., the lower side in FIG. 1) of the stator core 30.

Thereafter, the oblique parts of the first, second and third electric wire segments 41, 42 and 43 on the other axial side of the stator core 30 are joined to one another by welding, forming a second coil end part 47 of the stator coil 40.

More specifically, in the present embodiment, all the first electric wire segments 41 are divided into a plurality of groups each including four first electric wire segments 41. Further, for each of the groups, the straight portions of the first electric wire segments 41 of the group are circumferentially apart from one another by one magnetic pole pitch of the rotor and radially offset from one another by one layer. In other words, the radial positions of the straight portions of the first electric wire segments 41 are successively increased from the second layer in one slot 31 to the ninth layer in another slot 31. Moreover, the oblique parts of the first electric wire segments 41 of the group on the other axial side (i.e., the lower side in FIG. 1) of the stator core 30 are welded to one another, thereby serially joining the first electric wire segments 41 into an integral piece. Furthermore, the oblique part which extends from that one of the straight portions of the first electric wire segments 41 which is positioned at one end of the integral piece and at the second layer in the corresponding slot 31 is welded to the oblique part 42a of that one of the second electric wire segments 42 which has its straight portion positioned circumferentially away from the one end of the integral piece by one magnetic pole pitch. On the other hand, the oblique part which extends from that one of the straight portions of the first electric wire segments 41 which is positioned at the other end of the integral piece and at the ninth layer in the corresponding slot 31 is welded to the oblique part 43a of that one of the third electric wire segments 43 which has its straight portion positioned circumferentially away from the other end of the integral piece by one magnetic pole pitch. As a result, the four first electric wire segments 41 of the group, the second electric wire segment 42 and the third electric wire segment 43 are joined to one another to form an electric wire; the electric wire extends in the circumferential direction of the stator core 30 by approximately one turn and has the radially inner lead portion (i.e., the radially inner lead portion of the second electric wire segment 42) and the radially outer lead portion (i.e., the radially outer lead portion of the third electric wire segment 43) both of which are positioned on the one axial side (i.e., the upper side in FIG. 1) of the stator core 30.

Furthermore, in the present embodiment, each of the U-phase, V-phase and W-phase windings of the stator coil 40 is formed by serially joining sixteen electric wires formed as described above.

Figure 2:
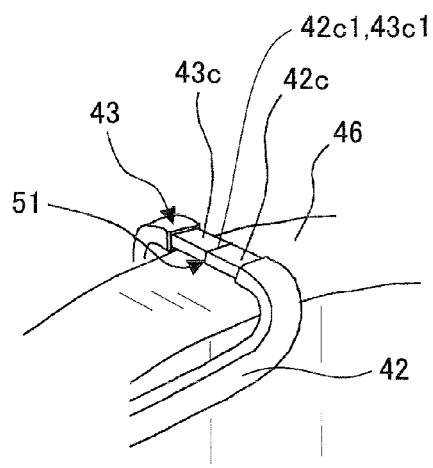
FIG. 2 is an enlarged perspective view showing part of a stator for an electric rotating machine according to the first embodiment.

More specifically, referring to FIG. 2, for each corresponding pair of the electric wires to be joined together, the second part 42c of the radially inner lead portion of one of the electric wires and the second part 43c of the radially outer lead portion of the other electric wire are positioned axially outward of the first coil end part 46 of the stator coil 40, with the respective distal end surfaces 42c1 and 43c1 of the second parts 42c and 43c abutting each other. Then, the distal end surfaces 42c1 and 43c1 of the second parts 42c and 43c are welded together, forming a weld 51 between the second parts 42c and 43c. The weld 51 is positioned axially outward of the first coil end part 46 of the stator coil 40, without protruding radially inward or radially outward from the first coil end part 46. In addition, the second parts 42c and 43c of the radially inner and outer lead portions together make up a crossover part that extends to cross over the annular first coil end part 46 from the radially inside to the radially outside of the first coil end part 46.

As a result, each of the U-phase, V-phase and W-phase windings of the stator coil 40 includes fifteen welds 51 and extends in the circumferential direction of the stator core 30 by approximately sixteen turns.

Moreover, for each of the U-phase, V-phase and W-phase windings of the stator coil 40, the radially inner lead portion and radially outer lead portion of the phase winding which are not welded to any other lead portions respectively make up an output terminal and a neutral terminal of the phase winding. Further, the neutral terminals of the U-phase, V-phase and W-phase windings are Y-connected to form the three-phase stator coil 40.

In addition, it should be noted that the radially inner and outer lead portions which make up the output and neutral terminals of the U-phase, V-phase and W-phase windings of the stator coil 40 may also be configured to have a different shape from the other radially inner and outer lead portions.

The above-described stator 50 according to the present embodiment has the following advantages.

In the present embodiment, the stator 50 includes the hollow cylindrical stator core 30 and the stator coil 40. The stator core 30 has the slots 31 that are formed in the radially inner surface of the stator core 30 and spaced in the circumferential direction of the stator core 30. The stator coil 40 is partially received in the slots 31 of the stator core 30 to have the first and second coil end parts 46 and 47 that respectively protrude from the axial end faces 30A of the stator core 30. The stator coil 40 is a three-phase stator coil which includes the U-phase, V-phase and W-phase windings. Each of the U-phase, V-phase and W-phase windings is formed by joining sixteen electric wires; each of the electric wires is formed by joining four first electric wire segments 41, one second electric wire segment 42 and one third electric wire segment 43. Moreover, for each joined pair of the electric wires, the radially inner lead portion of one of the electric wires is welded to the radially outer lead portion of the other electric wire to form the weld 51 therebetween; the radially inner lead portion is led out from the radially inner periphery of one slot 31 of the stator core 30 while the radially outer lead portion is led out from the radially outer periphery of another slot 31 of the stator core 30. The weld 51 is positioned axially outward of the first coil end part 46 of the stator coil 40, without radially protruding from the first coil end part 46.

With the above configuration, all the welds 51 between the electric wires forming the stator coil 40 are positioned not to radially protrude from the first coil end part 46. Consequently, it is possible to minimize the radial size of the stator coil 40, thereby minimizing the overall size of the entire stator 50.

Further, in the present embodiment, for each joined pair of the electric wires forming the stator coil 40, the weld 51 formed between the radially inner and outer lead portions of the electric wires is positioned so as to be substantially equidistant from the two slots 31 from which the radially inner and outer lead portions are respectively lead out.

With the above configuration, all the welds 51 between the electric wires forming the stator coil 40 are positioned substantially equidistant from the radially inner and outer peripheries of the annular first coil end part 46. Consequently, it is possible to reliably prevent the welds 51 from protruding from the first coil end part 46 radially inward or radially outward.

In the present embodiment, the radially inner lead portions of the electric wires forming the stator coil 40 are bent radially outward while the radially outer lead portions of the electric wires are bent radially inward.

With the above configuration, it is possible to reliably prevent the welds 51 formed between the radially inner and outer lead portions from protruding radially inward or radially outward from the first coil end part 46.

In the present embodiment, for each joined pair of the electric wires forming the stator coil 40, the radially inner and outer lead portions of the electric wires are joined by welding together the respective distal end surfaces 42c1 and 43c1 that are arranged to face each other in the radial direction of the stator core 30.

With the above configuration, it is possible to minimize the length of the crossover part that is made up of the second parts 42c and 43c of the radially inner and outer lead portions. In addition, it is also possible to minimize both the sizes of the weld 51 in the axial and circumferential directions of the stator core 30.

Second Embodiment

Figure 3:
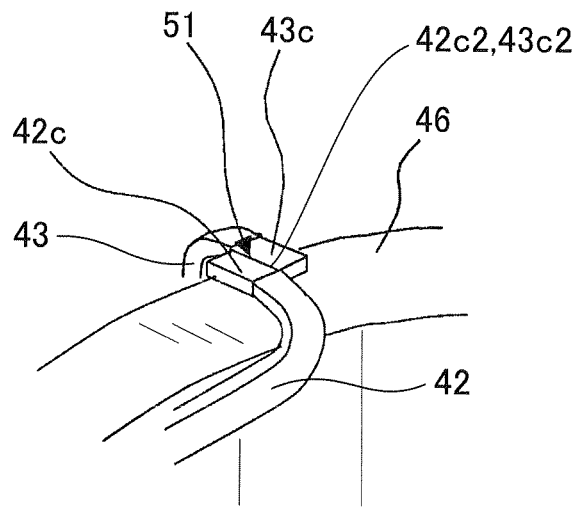
FIG. 3 is an enlarged perspective view showing part of a stator for an electric rotating machine according to the second embodiment of the invention.

Referring to FIG. 3, in this embodiment, for each corresponding pair of the electric wires to be joined together, the second part 42c of the radially inner lead portion of one of the electric wires and the second part 43c of the radially outer lead portion of the other electric wire are positioned axially outward of the first coil end part 46 of the stator coil 40, with a pair of circumferential side surfaces 42c2 and 43c2 of the second parts 42c and 43c abutting each other. Then, the circumferential side surfaces 42c2 and 43c2 of the second parts 42c and 43c are welded together, forming a weld 51 between the second parts 42c and 43c. The weld 51 is positioned axially outward of the first coil end part 46 of the stator coil 40, without protruding radially inward or radially outward from the first coil end part 46.

With the above configuration, it is possible to minimize the thickness of each of the welds 51 between the electric wires in the axial direction of the stator core 30.

Third Embodiment

Figure 4:
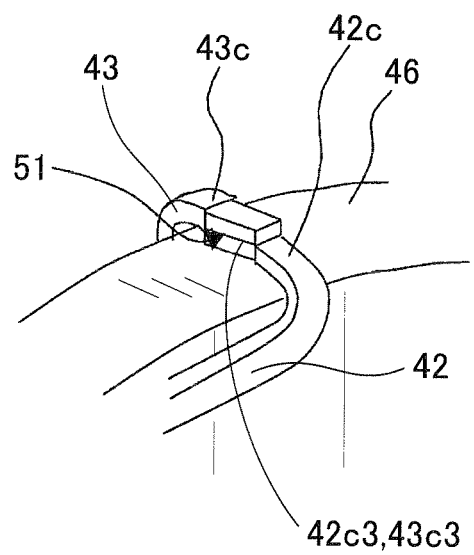
FIG. 4 is an enlarged perspective view showing part of a stator for an electric rotating machine according to the third embodiment of the invention.

Referring to FIG. 4, in this embodiment, for each corresponding pair of the electric wires to be joined together, the second part 42c of the radially inner lead portion of one of the electric wires and the second part 43e of the radially outer lead portion of the other electric wire are positioned axially outward of the first coil end part 46 of the stator coil 40, with a pair of axial side surfaces 42c3 and 43c3 of the second parts 42c and 43c abutting each other. Then, the axial side surfaces 42c3 and 43c3 of the second parts 42c and 43c are welded together, forming a weld 51 between the second parts 42c and 43c. The weld 51 is positioned axially outward of the first coil end part 46 of the stator coil 40, without protruding radially inward or radially outward from the first coil end part 46.

With the above configuration, it is possible to minimize the width of each of the welds 51 between the electric wires in the circumferential direction of the stator core 30.

Fourth Embodiment

Figure 5:
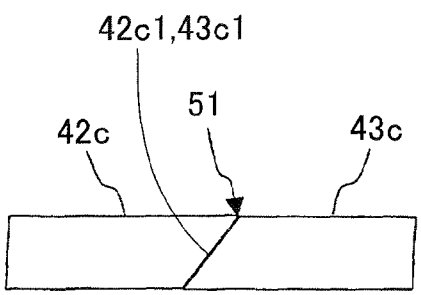
FIG. 5 is an enlarged axial view showing part of a stator for an electric rotating machine according to the fourth embodiment of the invention.

Referring to FIG. 5, in this embodiment, for each corresponding pair of the electric wires to be joined together, the second part 42c of the radially inner lead portion of one of the electric wires and the second part 43c of the radially outer lead portion of the other electric wire are positioned axially outward of the first coil end part 46 of the stator coil 40, with the respective distal end surfaces 42c1 and 43c1 of the second parts 42c and 43c abutting each other. Moreover, for each of the second parts 42c and 43c, the distal end surface is formed to extend obliquely with respect to the longitudinal direction (or the extending direction) of the second part. The angle between the distal end surface and the longitudinal direction of the second part may be set to, for example, 45°. Then, the distal end surfaces 42c1 and 43c1 of the second parts 42c and 43c are welded together, forming a weld 51 between the second parts 42c and 43c. The weld 51 is positioned axially outward of the first coil end part 46 of the stator coil 40, without protruding radially inward or radially outward from the first coil end part 46.

With the above configuration, it is possible to increase the contact surface area between the second parts 42c and 43c, thereby enhancing the strength of the weld 51 formed therebetween.

Fifth Embodiment

Figure 6:
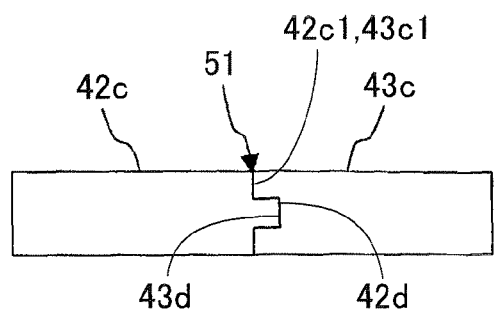
FIG. 6 is an enlarged axial view showing part of a stator for an electric rotating machine according to the fifth embodiment of the invention.

Referring to FIG. 6, in this embodiment, for each corresponding pair of the electric wires to be joined together, the second part 42c of the radially inner lead portion of one of the electric wires and the second part 43c of the radially outer lead portion of the other electric wire are positioned axially outward of the first coil end part 46 of the stator coil 40, with the respective distal end surfaces 42c1 and 43c1 of the second parts 42c and 43c abutting each other. Moreover, the distal end surface 42c1 of the second part 42c has a protrusion 42d formed thereon while the distal end surface 43c1 of the second part 43c has a recess 43d formed therein; the protrusion 42d is fitted into the recess 43d. Then, the distal end surfaces 42c1 and 43c1 of the second parts 42c and 43c are welded together, forming a weld 51 between the second parts 42c and 43c. The weld 51 is positioned axially outward of the first coil end part 46 of the stator coil 40, without protruding radially inward or radially outward from the first coil end part 46.

With the above configuration, it is also possible to increase the contact surface area between the second parts 42c and 43c, thereby enhancing the strength of the weld 51 formed therebetween. Moreover, with the protrusion 42d fitted into the recess 43d, it is possible to easily perform the process of welding together the distal end surfaces 42c1 and 43c1 of the second parts 42c and 43c.

In addition, it is also possible to: configure the distal end surface 42c1 of the second part 42c to have a recess formed therein instead of the protrusion 42d; configure the distal end surface 43c1 of the second part 43c to have a protrusion formed thereon instead of the recess 43d; and fit the protrusion formed on the distal end surface 43c1 into the recess formed in the distal end surface 42c1.

Sixth Embodiment

Figure 7:
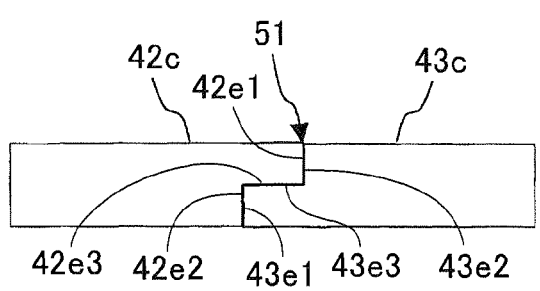
FIG. 7 is an enlarged axial view showing part of a stator for an electric rotating machine according to the sixth embodiment of the invention.

Referring to FIG. 7, in this embodiment, for each corresponding pair of the electric wires to be joined together, the second part 42c of the radially inner lead portion of one of the electric wires and the second part 43c of the radially outer lead portion of the other electric wire are positioned axially outward of the first coil end part 46 of the stator coil 40 so as to abut each other.

More specifically, in the present embodiment, the second part 42c is stepped at the distal end thereof to have a first surface 42e1, a second surface 42e2, and a third surface 42e3; the first surface 42e1 is perpendicular to the longitudinal direction of the second part 42c and positioned distalmost in the second part 42c; the second surface 42e2 is perpendicular to the longitudinal direction and recessed from the first surface 42e1 in the longitudinal direction; the third surface 42e3 extends parallel to the longitudinal direction to connect the first and second surfaces 42e1 and 42e2. On the other hand, the second part 43c is also stepped at the distal end thereof to have a first surface 43e1, a second surface 43e2, and a third surface 43e3; the first surface 43e1 is perpendicular to the longitudinal direction of the second part 43c and positioned distalmost in the second part 43c; the second surface 43e2 is perpendicular to the longitudinal direction and recessed from the first surface 43e1 in the longitudinal direction; the third surface 43e3 extends parallel to the longitudinal direction to connect the first and second surfaces 43e1 and 43e2. The second parts 42c and 43c are arranged so that: the first surface 42e1 abuts the second surface 43e2; the second surface 42e2 abuts the first surface 43e1; and the third surfaces 42e3 and 43e3 abut each other.

Then, the abutting pairs of the surfaces 42e1-e3 and 43e1-43e3 of the second parts 42c and 43c are welded together to form a weld 51 between the second parts 42c and 43c. The weld 51 is positioned axially outward of the first coil end part 46 of the stator coil 40, without protruding radially inward or radially outward from the first coil end part 46.

With the above configuration, it is also possible to increase the contact surface area between the second parts 42c and 43c, thereby enhancing the strength of the weld 51 formed therebetween. Moreover, with the abutting pairs of the surfaces 42e1-e3 and 43e1-43e3, the second parts 42c and 43c are positioned relative to each other, thereby facilitating the process of welding them together.

Seventh Embodiment

Figure 8:
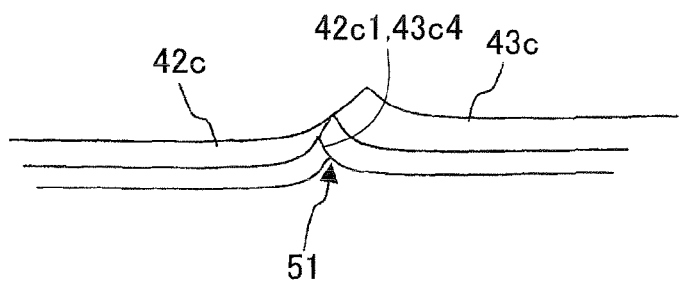
FIG. 8 is a perspective view showing part of a stator for an electric rotating machine according to the seventh embodiment of the invention.
Figure 9:
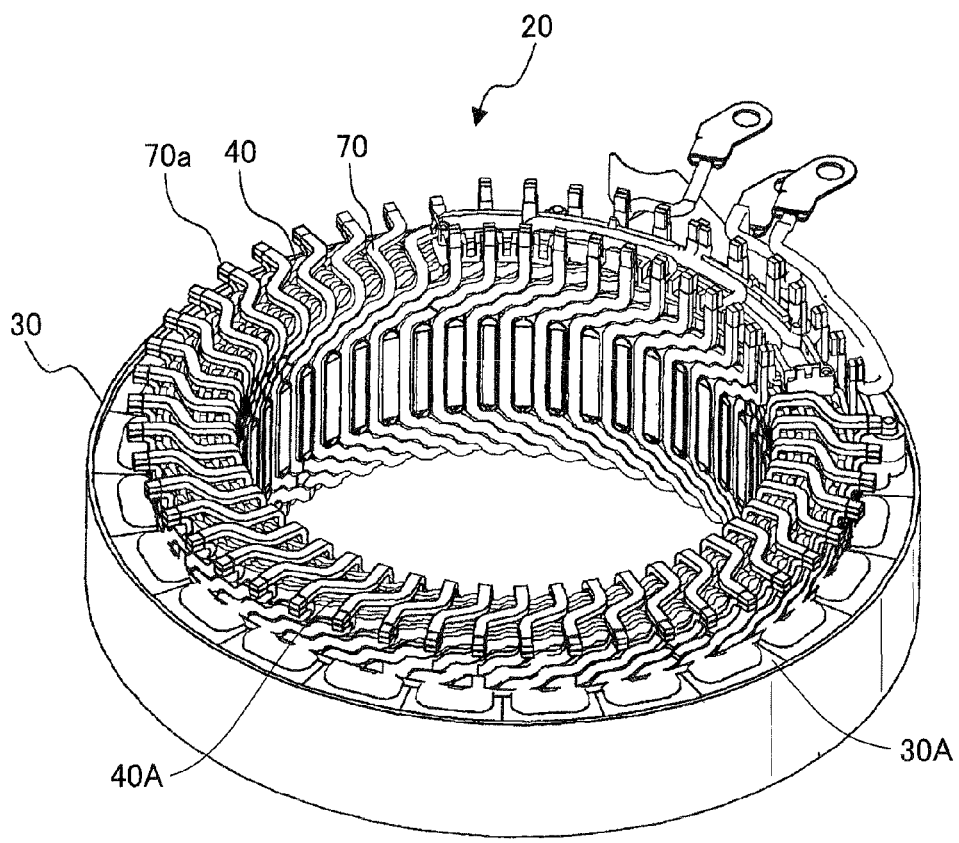
FIG. 9 is a perspective view of a stator for an electric rotating machine according to a related art.

Referring to FIG. 8, in this embodiment, for each corresponding pair of the electric wires to be joined together, the second part 42c of the radially inner lead portion of one of the electric wires and the second part 43c of the radially outer lead portion of the other electric wire are positioned axially outward of the first coil end part 46 of the stator coil 40 so as to abut each other.

More specifically, in the present embodiment, both the second parts 42c and 43c are bent axially outward (i.e., from the horizontal direction to the upward direction in FIG. 8) at their respective distal ends so that the distal end surface 42c1 of the second part 42c and an axially inner side surface 43c4 of the second part 43c extend obliquely at the same angle with respect to the axial direction of the stator core 30. Moreover, the second parts 42c and 43c are arranged so that the distal end surface 42c1 of the second part 42c abuts the axially inner side surface 43c4 of the second part 43c.

Then, the distal end surface 42c1 of the second part 42c and the axially inner side surface 43c4 of the second part 43c are welded together to form a weld 51 between the second parts 42c and 43c. The weld 51 is positioned axially outward of the first coil end part 46 of the stator coil 40, without protruding radially inward or radially outward from the first coil end part 46.

With the above configuration, it is possible to bring the second parts 42c and 43c into pressed contact with each other, thereby enhancing the strength of the weld 51 formed therebetween.

In addition, it is also possible to weld the second parts 42c and 43c with an axially inner side surface of the second part 42c abutting the distal end surface 43c1 of the second part 43c or with the axially inner side surfaces of the second parts 42c and 43c abutting each other.

While the above particular embodiments of the present invention have been shown and described, it will be understood by those skilled in the art that various modifications, changes, and improvements may be made without departing from the spirit of the invention.

For example, in the first embodiment, the stator core 30 is formed as an integral piece; each of the electric wires making up the stator coil 40 is formed by first inserting the electric wire segments 41-43 into corresponding ones of the slots 31 of the stator core 30 and then joining them to one another by welding.

However, the stator core 30 may also be comprised of a plurality of stator core segments; each of the electric wires making up the stator coil 40 may also be formed as one integral piece. In this case, the stator 50 may be formed by: (1) assembling the electric wires together to form the stator coil 40; (2) assembling each of the stator core segments to the stator coil 40; and (3) joining the stator core segments to one another to make up the stator core 30.

What is claimed is:

1. A stator for an electric rotating machine, the stator comprising:
    a hollow cylindrical stator core having a plurality of slots that are formed in a radially inner surface of the stator core and spaced in a circumferential direction of the stator core; and
    a stator coil comprised of a plurality of electric wires mounted on the stator core, the stator coil being partially received in the slots of the stator core to have a pair of coil end parts that respectively protrude from a pair of axial end faces of the stator core, wherein
    each of the electric wires is formed by joining a plurality of first electric wire segments, a second electric wire segment and a third electric wire segment,
    each of the first electric wire segments is substantially U-shaped to include a pair of straight portions that are respectively inserted in corresponding two of the slots of the stator core and a turn portion that connects the pair of the straight portions and is located on one axial side of the stator core,
    the second electric wire segment is configured to include a straight portion that is inserted in a corresponding one of the slots of the stator core so as to be located radially innermost in the corresponding slot and a radially inner lead portion that extends from the straight portion of the second electric wire segment so as to be located on the one axial side of the stator core,
    the third electric wire segment is configured to include a straight portion that is inserted in a corresponding one of the slots of the stator core so as to be located radially outermost in the corresponding slot and a radially outer lead portion that extends from the straight portion of the third electric wire segment so as to be located on the one axial side of the stator core, all the turn portions of the first electric wire segments of the electric wires together make up one of the coil end parts of the stator coil on the one axial side of the stator core, the stator coil is a multi-phase stator coil which is comprised of a plurality of phase windings, each of the phase windings of the stator coil is formed of at least two of the electric wires, the radially inner lead portion of the second electric wire segment of one of the two electric wires is jointed to the radially outer lead portion of the third electric wire segment of the other electric wire to form a joint therebetween, the joint is positioned axially outward of the coil end part which is made up of all the turn portions of the first electric wire segments, without radially protruding from the coil end part, each of the radially inner and radially outer lead portions of the two electric wires has a stepped distal end surface, and the distal end surfaces of the radially inner and radially outer lead portions are fitted and joined to each other to form the joint between the radially inner and radially outer lead portions.

2. The stator as set forth in claim 1, wherein the joint is substantially equidistant from the two slots from which the radially inner and radially outer lead portions of the two electric wires are respectively led out.

3. The stator as set forth in claim 1, wherein the radially inner lead portion is bent radially outward while the radially outer lead portion is bent radially inward.

* * * * *